US012609052B2

(12) United States Patent
Hong et al.

(10) Patent No.: US 12,609,052 B2
(45) Date of Patent: Apr. 21, 2026

(54) HORTICULTURE LABEL STAKE

(71) Applicant: CCL Label, Inc., Framingham, MA (US)

(72) Inventors: Le-Hoa Hong, Brea, CA (US); Jay Sato, Mission Viejo, CA (US)

(73) Assignee: CCL Label, Inc., Framingham, MA (US)

( * ) Notice: Subject to any disclaimer, the term of this patent is extended or adjusted under 35 U.S.C. 154(b) by 124 days.

(21) Appl. No.: 18/533,493

(22) Filed: Dec. 8, 2023

(65) Prior Publication Data

US 2024/0194094 A1 Jun. 13, 2024

Related U.S. Application Data

(60) Provisional application No. 63/431,109, filed on Dec. 8, 2022.

(51) Int. Cl.
*G09F 3/02* (2006.01)
*G09F 3/10* (2006.01)

(52) U.S. Cl.
CPC .............. *G09F 3/0288* (2013.01); *G09F 3/10* (2013.01); *G09F 2003/0226* (2013.01); *G09F 2003/023* (2013.01); *G09F 2003/0269* (2013.01)

(58) Field of Classification Search
None
See application file for complete search history.

(56) References Cited

U.S. PATENT DOCUMENTS

| | | | | |
|---|---|---|---|---|
| 5,829,789 | A * | 11/1998 | Treleaven | B65D 23/14 428/41.9 |
| 6,035,568 | A * | 3/2000 | Grosskopf | G09F 3/0288 40/630 |
| 2010/0233412 | A1* | 9/2010 | Wong | G11B 23/40 428/47 |
| 2012/0096751 | A1* | 4/2012 | Ray, III | G09F 3/0288 40/638 |
| 2012/0234481 | A1* | 9/2012 | Raming | G09F 3/0288 283/105 |
| 2020/0180280 | A1* | 6/2020 | Herranen | B32B 7/06 |
| 2021/0398459 | A1 | 12/2021 | Cook | |

* cited by examiner

*Primary Examiner* — Laura C Powers
(74) *Attorney, Agent, or Firm* — McDonald Hopkins LLC

(57) ABSTRACT

A label sheet assembly is shown and described herein. The label sheet assembly includes a label construction comprising label portion and a stake portion, where the stake portion is detachable from the label portion. The label construction is configured to adhere to a container, such as a container for holding a plant, and the stake portion can be separated from the label at a later time as desired by an end user.

4 Claims, 17 Drawing Sheets

OR

HORTICULTURE LABEL STAKE

CROSS-REFERENCE TO RELATED APPLICATIONS

The present application claims priority to and the benefit of U.S. Provisional Application No. 63/431,109 filed on Dec. 8, 2022, the disclosure of which is incorporated herein by reference in its entirety.

FIELD OF INVENTION

The present invention relates to a label for use in horticulture applications. In particular, the present invention relates to a label portion comprising a label that is suitable for identifying a plant residing in a container (e.g., a pot), and a portion that is detachable from the label portion suitable for identifying the plant after it is removed from the container and planted in another location.

BACKGROUND

Plants sold at retail often have a label affixed to the container holding the plant. The label may include information identifying the type of plant in the container. The label includes a portion that is not removable from the container. The label may also include a removable tag portion. The tag portion is configured to be removed from the label construction and suitable for placement as desired by the user such as inserted into the soil or into a slot in the container. The removable tag portion may also be referred to as a stake. The removable tag portion is often shaped to have a pointed end to allow for easier insertion into the ground. The tag could also be configured with an "arrow head" having a ledge such that the end of the arrow head could be inserted into a slot, where the ledges would engage an interior portion of a container making removal of the tag from the slot more difficult.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a self-adhesive label having a label section and a removable stake portion. The label is suitable for adhering to a container, such as a container for holding a plant, and the stake portion can be separated from the label at a later time as desired by an end user. The stake portion is configured with a shape to make it easier to insert the stake into the ground or soil. The present self-adhesive label is provided with an arrangement of adhesive layer and cut configurations in a face layer, adhesive layer, and/or liner layer to allow for the adhesion of the label to a surface but allowing for the easy removal of the stake portion from the label and where the stake portion has little to no adhesive exposure upon removal from the label.

The invention is a die cut label construction that has a label portion and a detachable stake portion. The primary use would be to identify potted plants while the plants are still in the pot (overall label construction), and later when the plant is planted in the ground (detachable stake portion).

The label portion has pressure sensitive adhesive which allows the label construction to adhere to a container. The detachable stake portion can be separated from the label portion, and is configured with minimal or no adhesive, or can be configured after separation to minimize adhesive exposure for use in the soil. The front of the label and stake portion can be printed with information. The back side of the stake portion can also be printed with information.

In a first embodiment, the label construction is made of a semi-rigid film face, a pressure sensitive adhesive, and a liner. The adhesive is pattern printed so that it is located behind the label portion but not behind the stake portion. In one embodiment, it can be advantageous to apply adhesive along the outer edge of the stake portion to help it stick to the container. The entire label construction perimeter is kiss-cut to the liner. The stake portion can be separated from the label portion by using perforations or a semi-cut through the film where it can be snapped off by folding.

In a second embodiment, the label construction is made of a semi-rigid film face, a pressure sensitive adhesive, and a liner. The adhesive is applied over the entirety of the label construction covering the backs of both the label portion and the stake portion. The label construction is kiss-cut to the liner around the label portion and through-cut with perforations and selectively located long cuts around the stake portion. The perimeter cuts around the stake portion may also be created instead by slit over perforation cutting where the face film is cut all the way through and the liner is perforated. When the label construction is removed from the liner, the cuts around the stake portion allow the liner to come up with the stake portion so the stake portion has no exposed adhesive, and the kiss-cuts around the label portion separates the label portion from the liner, which exposes adhesive that can be used to adhere the label construction to a surface. A kiss-cut to the film face may also be made in the liner to create an edge of exposed adhesive on the stake portion when it is removed from the liner to aid in more secure adhesion of the label construction to a pot. The perforations between the label portion and the stake portion allow the stake portion to be later separated along with its backing liner. The stake portion is intended to be used in the soil with the backing liner attached.

In a third embodiment, the label construction is made of a semi-rigid film face, pressure sensitive adhesive, and a liner. The thickness or rigidity of the film for this embodiment can be up to half that of the first and second embodiments described above. The adhesive is applied over the entirety of the label construction covering the backs of both the label portion and the stake portion. The label construction is kiss-cut to the liner around the label portion and through-cut with perforations and selectively located long cuts around the stake portion. The perimeter cuts around the stake portion may also be created instead by slit over perforation cutting where the face film is cut all the way through and the liner is perforated. When the label construction is removed from the liner, the cuts around the stake portion allow the liner to come up with the stake portion so the stake portion initially has no exposed adhesive, and the kiss-cuts around the label portion separate the label portion from the liner, which exposes adhesive that can be used to adhere the label construction to a surface. A kiss-cut to the film face may also be made in the liner to create an edge of exposed adhesive on the stake portion when it is removed from the liner to aid in adhering the label construction to a container. The stake portion is configured to be folded on a weakened fold line (perforation or kiss-cut) after separating from the label portion and removing the backing liner. This effectively covers the adhesive, doubles the thickness and rigidity of the stake portion, and allows both the resulting front and back of the stake to be easily printed while still on the liner.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is label construction suitable for use with labeling horticultural items contained in a container. The label construction includes a label portion configured to be adhered to a container, and a removable stake portion configured to be inserted at a selected location such as, for example, inserted into the ground or soil of the container or another location and/or inserted into a slot of the container or other receptacle. The label construction is configured such that the removable stake portion has minimal or no exposed adhesive upon separation from the label construction.

Figure 1:
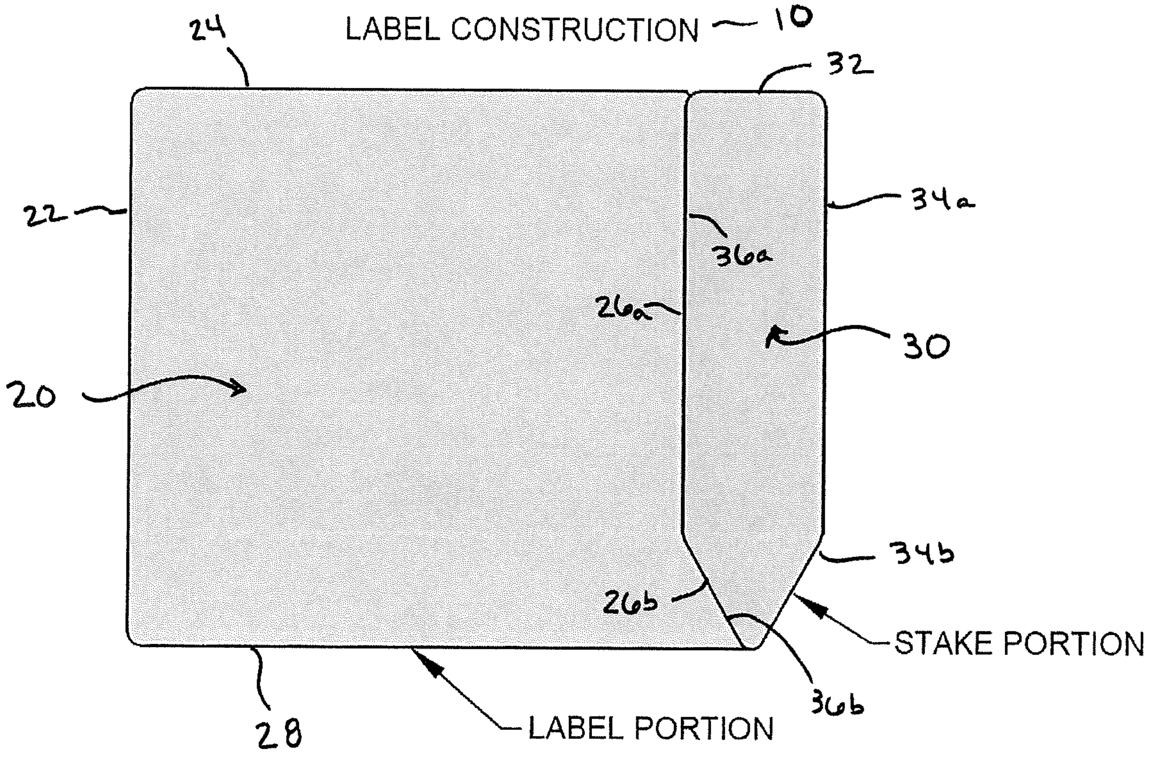
FIG. 1 is a top view of a label construction in accordance with an embodiment of the invention.

FIG. 1 shows an embodiment of a label construction in accordance with an embodiment of the invention. The label construction 10 comprises a label portion 20 and a stake portion 30. The label portion is defined by edges 22, 24, 26*a*, 26*b*, and 28. Such edges would be defined within a label sheet. The stake portion is defined by edges 32, 34*a*, 34*b*, 36*a*, and 36*b*. The stake portion defines a pointed end defined by angled edges 34*b* and 36*b*. The stake portion 30 is detachable from the label portion 20. The edges 26*a* and 26*b* of label portion 20 and the edges 36*a* and 36*b* of stake portion 30 are defined by cuts (e.g., kiss-cuts, continuous cuts, perforation through-cuts, perforation kiss-cuts, etc.) within one or more layers defining the label construction.

Figure 2:
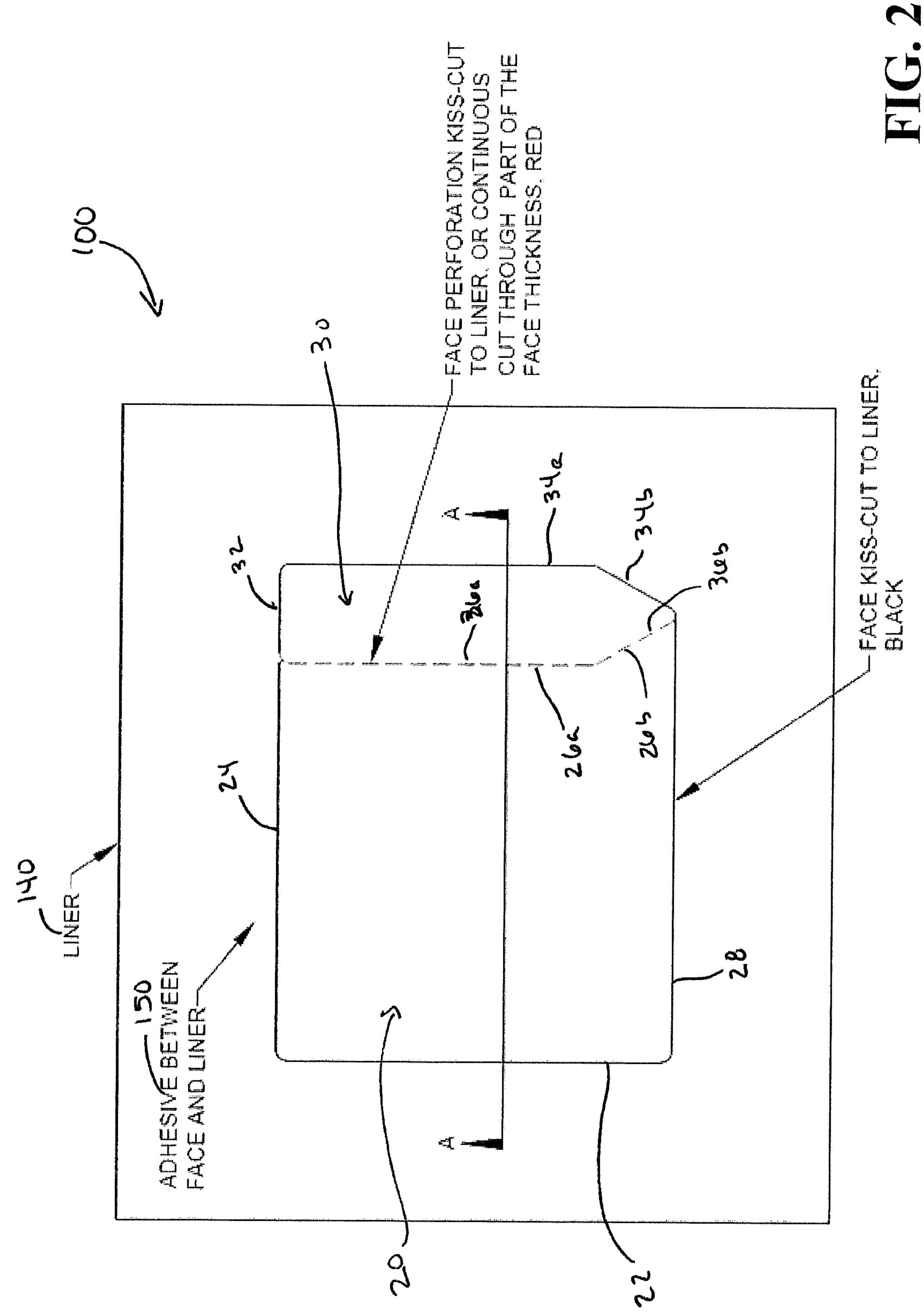
FIG. 2 is a bottom view of a sheet comprising a label construction in accordance with an embodiment of the invention.
Figure 3A:
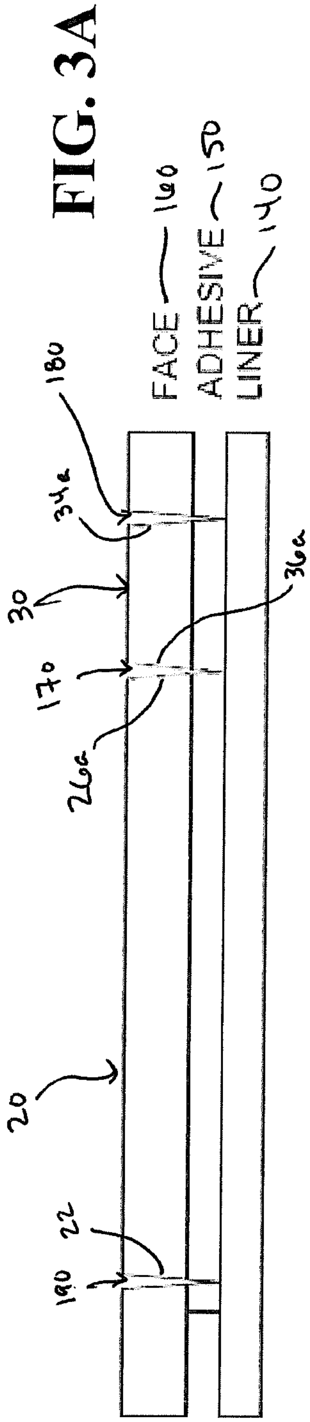
FIG. 3A is cross-section of a first embodiment of the sheet of FIG. 2 taken along line A-A.
Figure 3B:
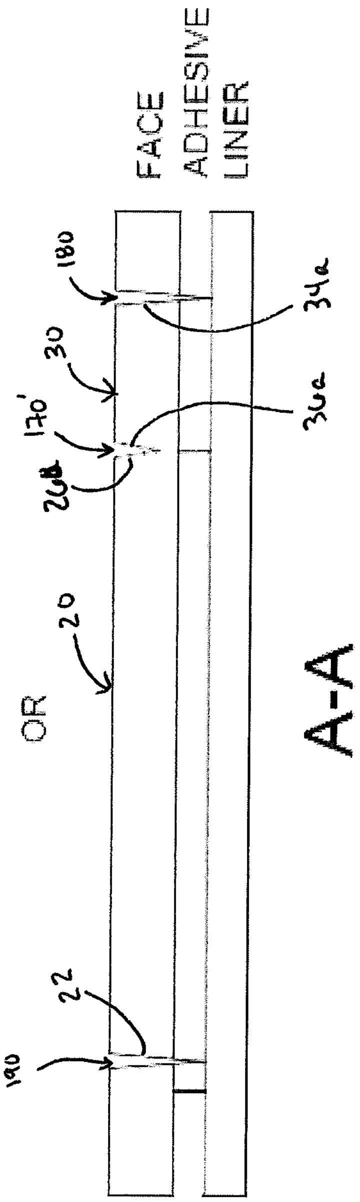
FIG. 3B is a cross-section of a second embodiment of the sheet of FIG. 2 taken along line A-A.
Figure 4:
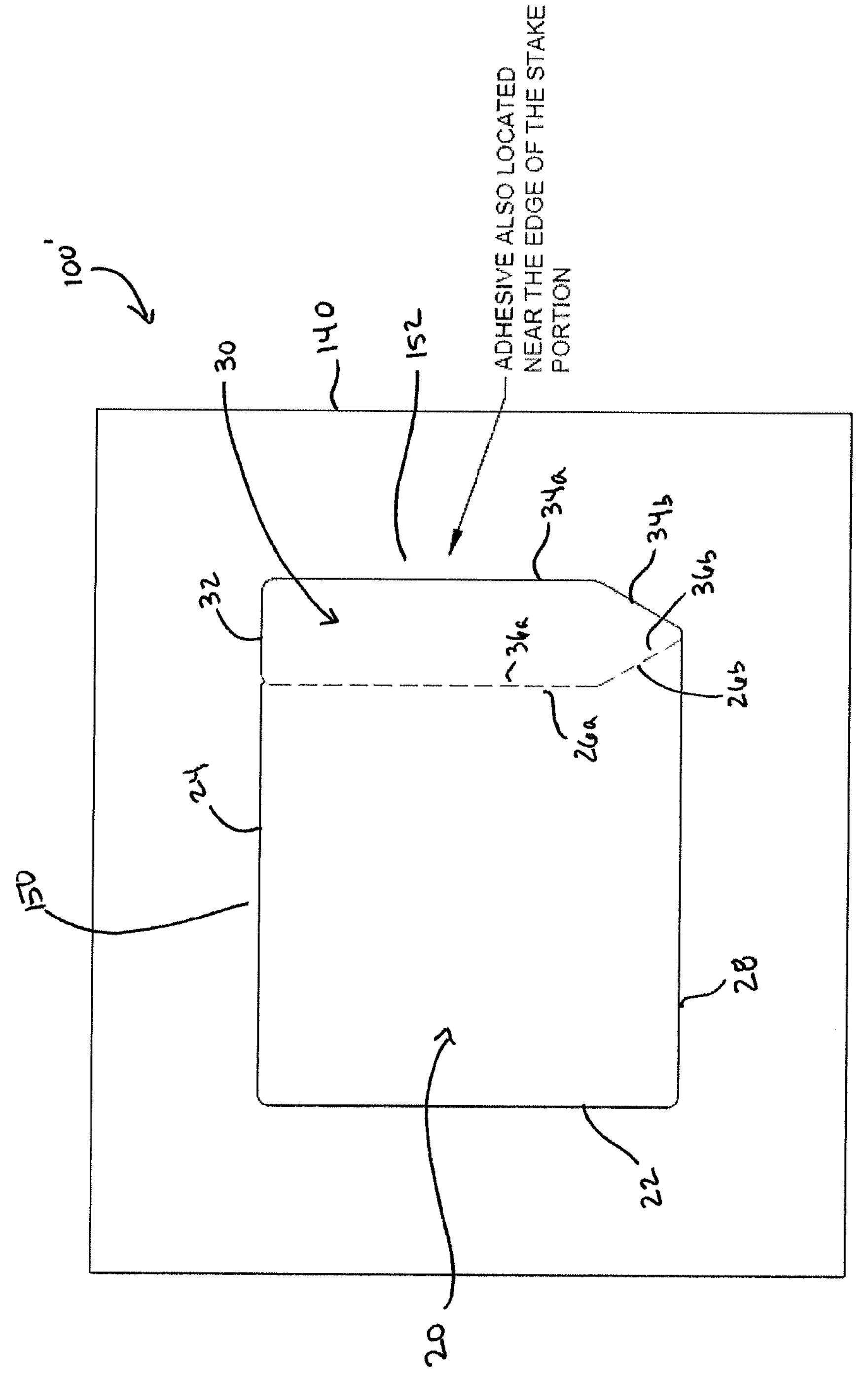
FIG. 4 is a bottom view of another embodiment of the sheet of FIG. 2.

FIGS. 2-4 show embodiments of a sheet 100 comprising a label 10. The sheet includes a liner layer 140, a facer layer 160, and an adhesive 150 disposed in certain regions between the face layer and the liner layer. In the embodiments of FIGS. 2-4, the adhesive 140 is disposed or patterned in the region defining the label portion 20 but generally not under the stake portion 30. The edges of the label are defined by cuts through the face layer and/or the adhesive layer. In FIG. 3A the edges 22 and 26*a* are formed by kiss-cuts 190 and 170, respectively, through the face layer to the liner. The cut 170 forms the edge 36*a* of the stake portion, and edge 34*a* of the stake portion is formed by cut 180 through the face layer to the liner.

In an alternate body shown in FIG. 3B, the edge 26*a* of the label and the edge 36*a* of the stake portion is formed by a partial cut 170' that is cut through only a portion of the film. The stake can be separated from the label portion by folding and snapping off the stake portion from the structure. In the embodiment in FIGS. 2-4, the cuts 170, 170' are provided perforation cuts or continuous cuts.

FIG. 4 shows an alternative embodiment 100' that is the same as the label sheet 100 except that there is adhesive disposed/patterned on a under an area 152 of the stake portion. In this embodiment, the adhesive is patterned near an edge of the stake. This may allow the stake to be lightly adhered to a container, while having a relatively small amount of adhesive that will create issues when inserted into the soil.

In other embodiments, the adhesive can be disposed such that it substantially covers the entirety of the label sheet and is disposed underneath both the label portion and the stake portion of the label construction.

Figure 5:
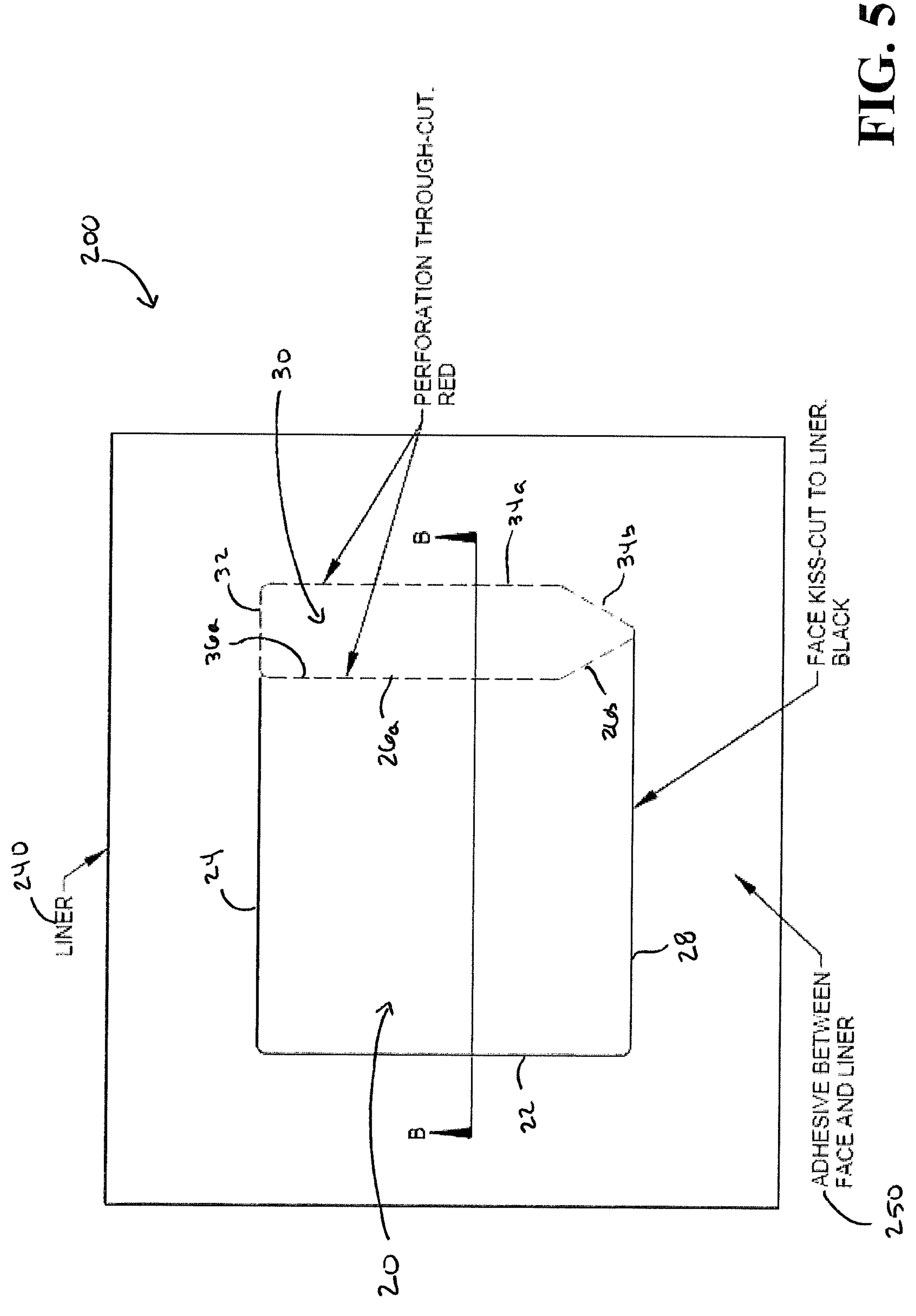
FIG. 5 is a bottom view of a sheet comprising a label construction in accordance with an embodiment of the invention.
Figure 6:
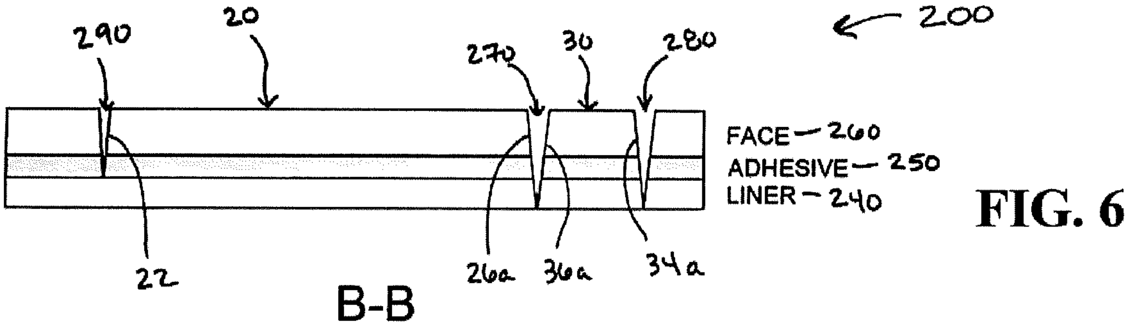
FIG. 6 is a cross-section of the sheet of FIG. 5 taken along line B-B.

In FIGS. 5 and 6, the label sheet 200 includes a liner 240, a face layer 260, and an adhesive layer 250 disposed between the face layer and the liner layer. The edges 22, 24, and 26 of label portion 20 can be formed by a face kiss-cut 290 to the liner. Edges 26*a* and 26*b* of the label portion and the edges of the stake portion can be formed by a perforation through-cut 270 all the way through the liner, and the liner is perforated. When the label is removed from the liner, the cuts defining the stake portion allow the liner to come up with the stake portion so that the adhesive on the stake portion is not exposed. The kiss-cuts around the label portion separate the label from the liner to expose the adhesive and allow the label portion to be adhered to a container surface. In an alternative embodiment, the cut 280 may be a solid through-cut rather than a perforation through-cut.

Figure 7:
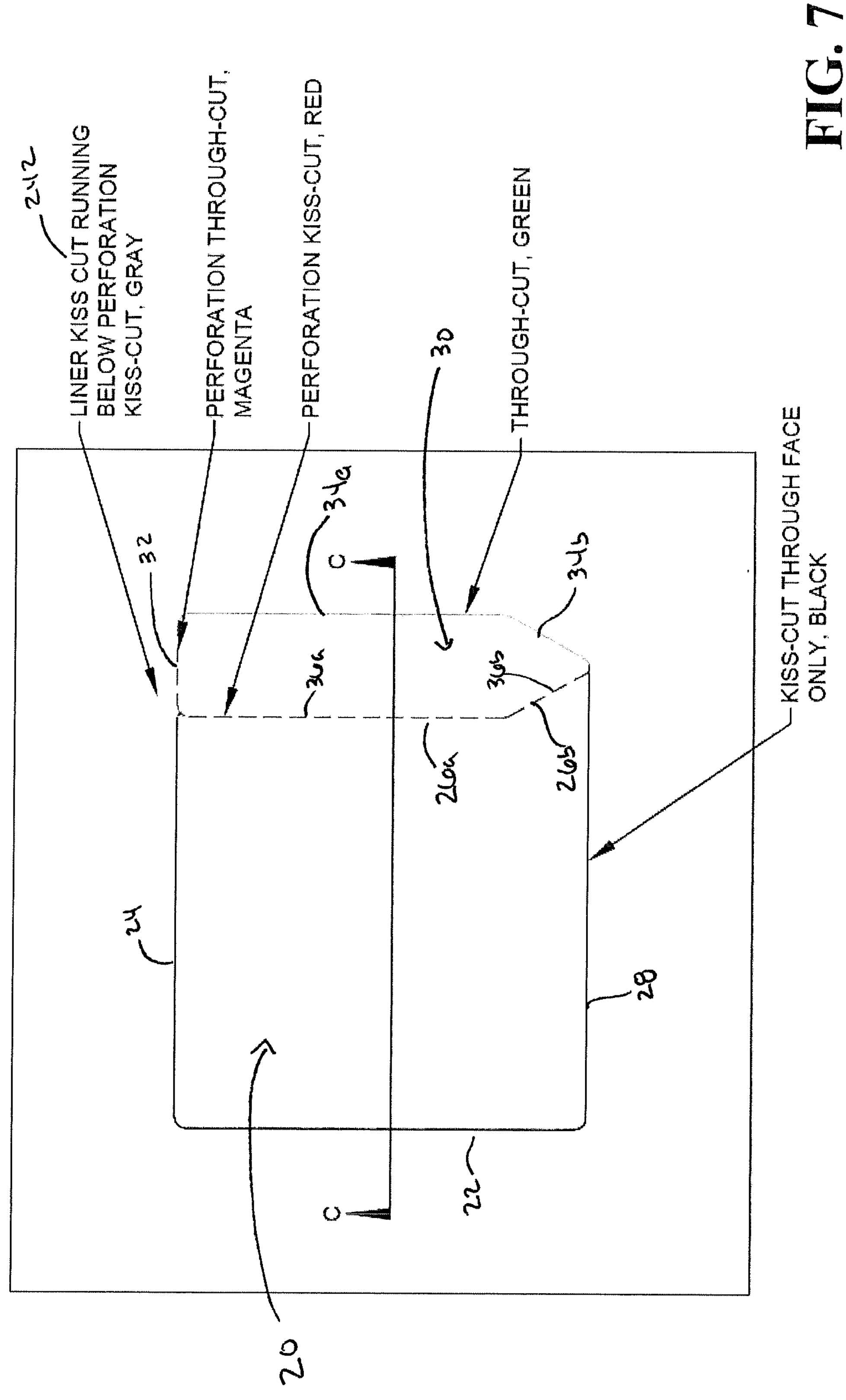
FIG. 7 is a bottom view of a sheet comprising a label construction in accordance with an embodiment of the invention.
Figure 8:
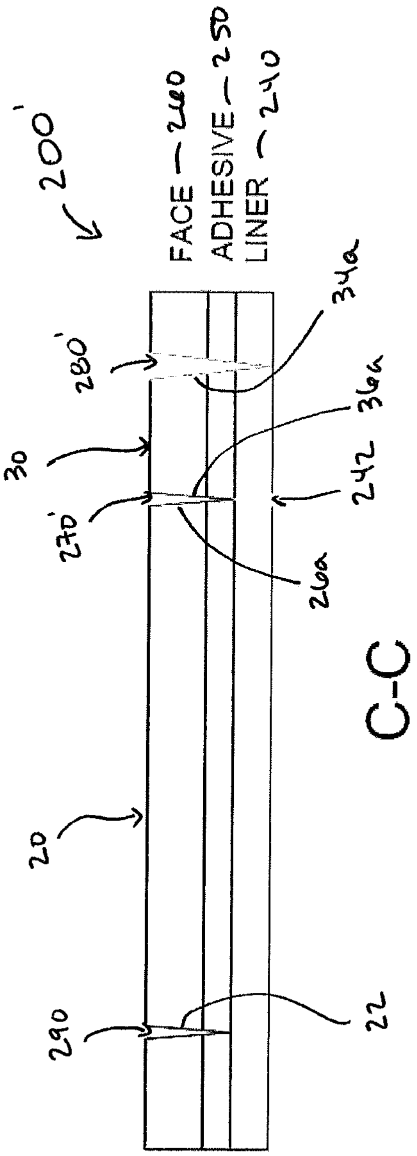
FIG. 8 is a cross-section of the sheet of FIG. 7 taken along line C-C.

In FIGS. 7 and 8, sheet 200' includes a label construction formed in the sheet. The edges 22, 24, and 28 are formed by kiss-cuts through the face and adhesive only to the liner. Edges 34*a* and 34*b* of the stake portion are formed by a through-cut 280' through the face layer and the liner. Edge 32 is formed by a perforation through-cut all the way through the liner, and edges 36*a*, and 36*b* of the stake portion and edges 26*a* and 26*b* of the label portion are formed by a perforation kiss-cut 270' through the face layer and the adhesive layer to the liner and a kiss-cut 242 is made in the liner below the perforation cut 270'.

Figure 10:
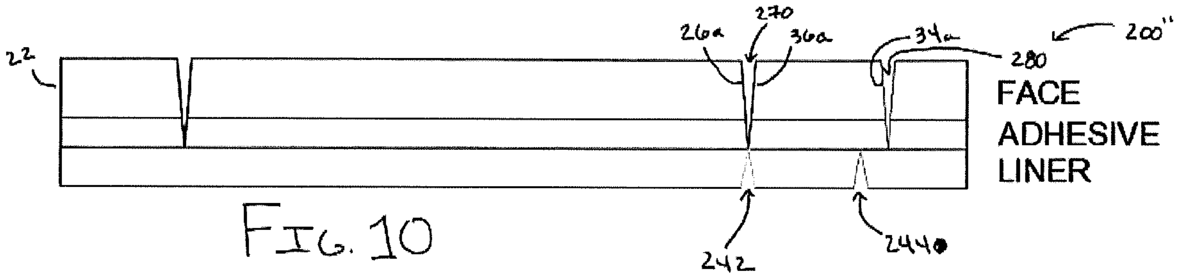
FIG. 10 is a cross-section of the sheet of FIG. 9 taken along line D-D.
Figure 9:
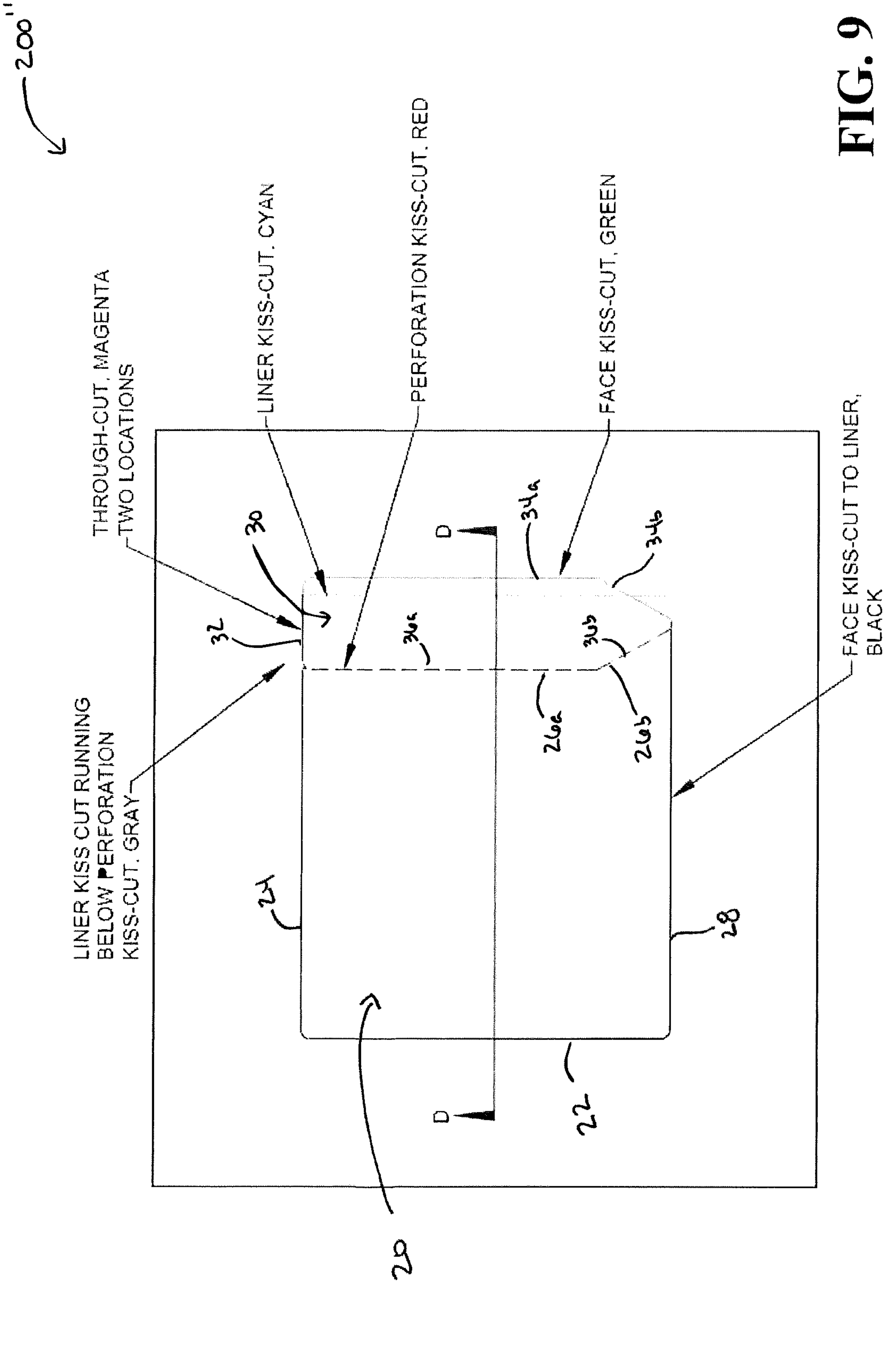
FIG. 9 is a bottom view of a sheet comprising a label construction in accordance with an embodiment of the invention.

In FIGS. 9 and 10, another embodiment of a label sheet 200" is shown. The edges 22, 24, and 28 of the label portion are created as discussed above by kiss-cuts through the face to the liner. The edges 36*a*, 36*b*, 26*a*, and 26*b* are created by a perforation kiss-cut 270 through the face and adhesive to the liner, and a liner kiss-cut 242 to the adhesive provided under the cut 270. Edge 34*a* and part of edge 34*b* are created by a face kiss-cut 280 to the liner. A liner kiss-cut 244 (cut through the liner to the adhesive) is provided along the length of the stake portion. This allows for a portion of the liner to be removed from the stake portion to expose some of the adhesive along an edge of the stake portion.

In one embodiment, the label construction is configured such that the stake portion comprises two sections having the same or similar profile, and the stake portion is formed by folding the two sections along a fold line. FIGS. 11-17 depict embodiments of a label with a foldable stake portion. The label may be formed from a construction comprising a liner layer 1100, a face layer 1300, and an adhesive layer 1200. The adhesive layer, may substantially cover the back of the face layer, covering the backs of both the label portion and the stake portion. The stake portion is formed by cuts such that when the label construction is removed from the liner, the stake portion allows the liner to come up with the stake portion so that the stake portion has no exposed adhesive. The liner can be removed from the stake portion to expose the adhesive, and the sections of the stake portion can be folded to mate the sections and form a single stake portion.

Figure 11:
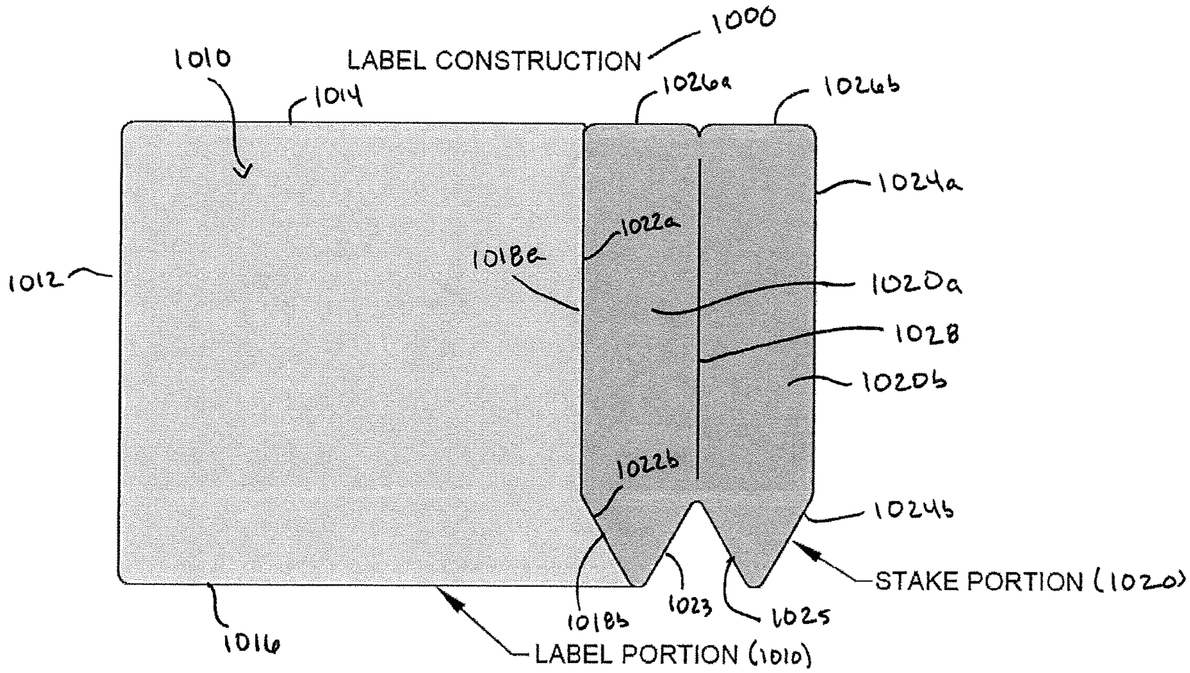
FIG. 11 is a top view of a label in accordance with an embodiment of the invention.

In FIG. 11 a label construction 1000 includes a label portion 1010, and a stake portion 1020. The label portion is defined by edges 1012, 1014, 1016, 1018*a*, and 1018*b* formed from die cuts in a face sheet. The stake portion 1020 includes a first section 1020 and a second section 1020*b*. The stake portion 1020 is formed, after separation from the label portion, by folding section 1020*a* and 1020*b* along the fold line 1028. The stake portion is defined by edges 1022*a*, 1022*b*, 1023, 1025, 1024*a*, 1024*b*, 1026*a*, and 1026*b*. When the stake portion is folded along the fold line 1028, edge 1024*a* aligns with edge 1022*a*, edge 1024*b* aligns with edge 1022*a*, edge 1025 aligns with edge 1023, and edge 1026*b* aligns with edge 1026*a* to form the stake portion.

The various edges can be formed by any suitable cut to define the edge. Generally, edges 1012, 1014, and 1016 can be formed by a face kiss-cut to the liner (see, e.g., face kiss-cut 1030 in FIGS. 13, 15A, 15B, 17A, and 17B). The fold line 1028 of the stake portion can generally be formed of a perforation through-cut 1050 (through the liner) or a perforation kiss-cut 1052 (to the liner).

Figure 12:
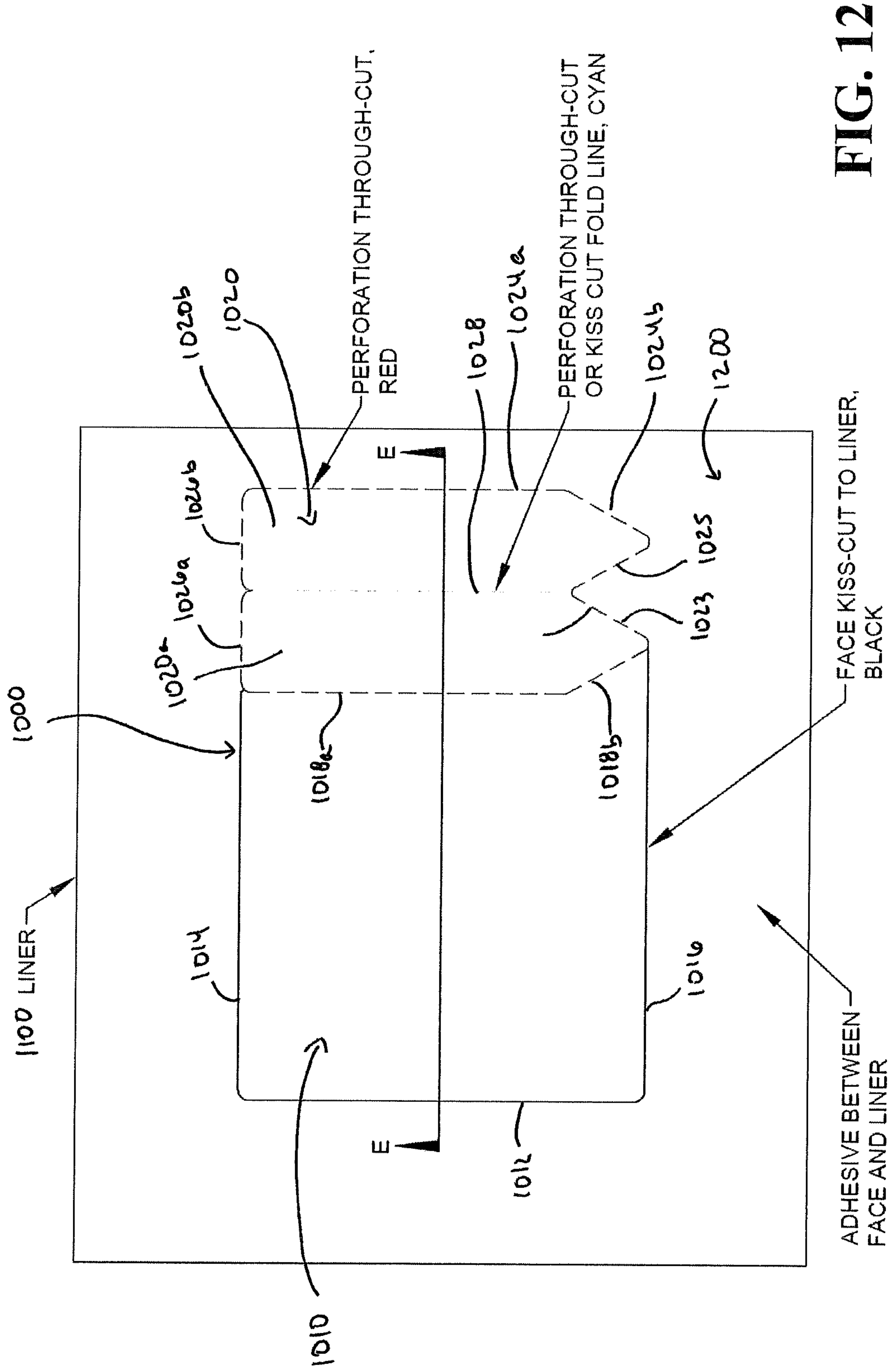
FIG. 12 is a bottom view of a sheet containing the label of FIG. 11.
Figures 13A, 13B:
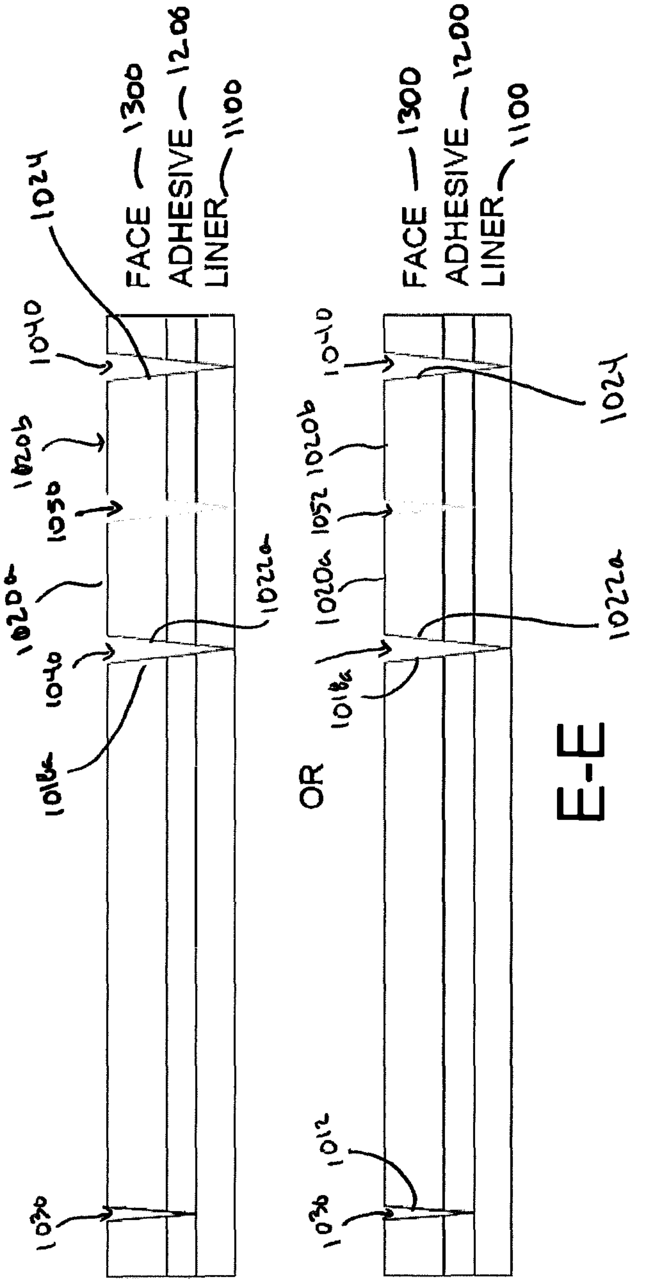
FIG. 13A is a cross-sectional view of the sheet of FIG. 12 taken along line E-E.
FIG. 13B is a cross-sectional view of an alternate embodiment of the sheet of FIG. 12 taken along line E-E.

In FIGS. 12, 13A, and 13B, the edges of the stake portion are formed by a perforation through-cut 1040, cut through the liner.

Figure 14:
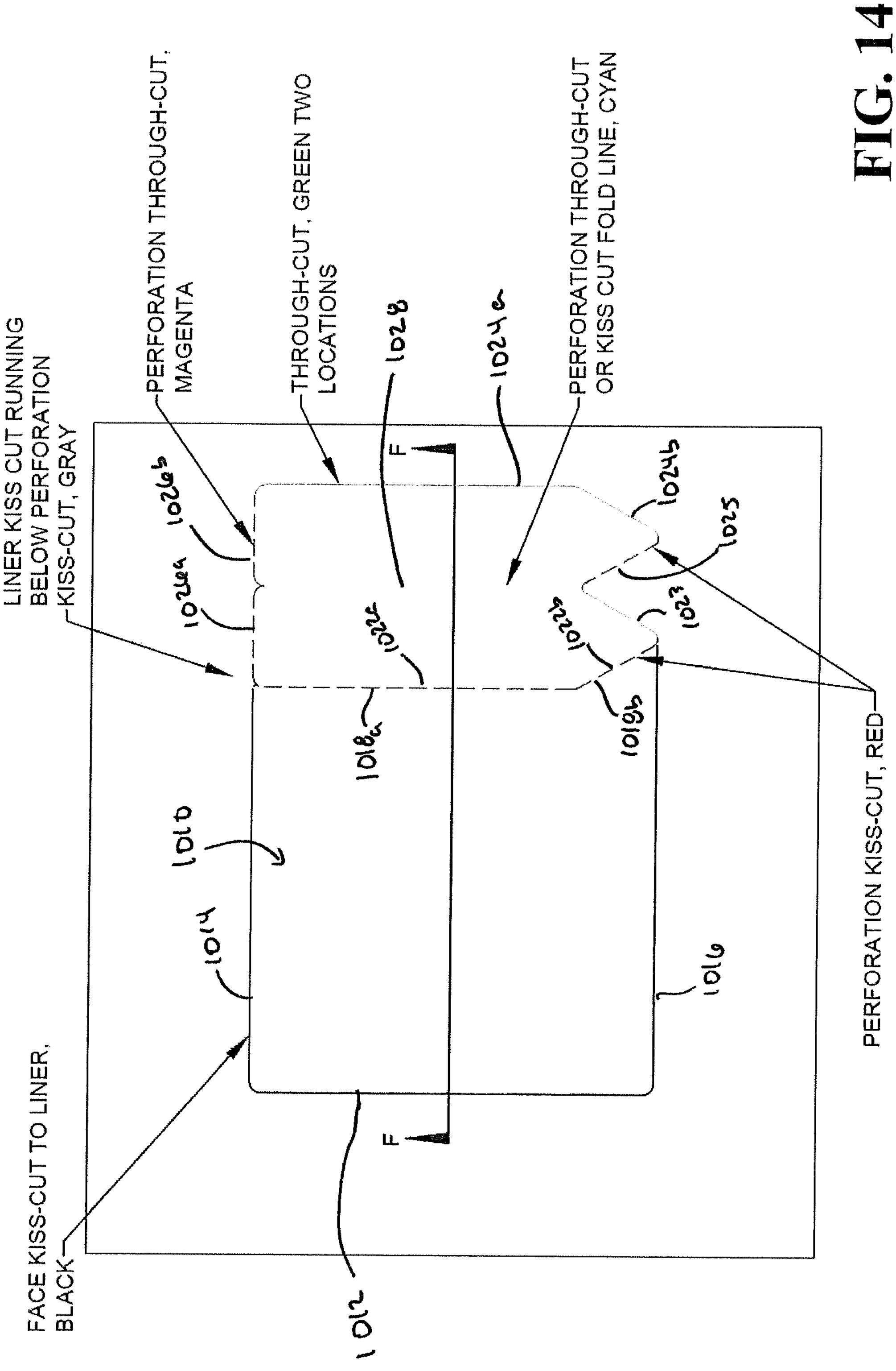
FIG. 14 is a bottom view of a sheet containing the label of FIG. 11.
Figure 15A:
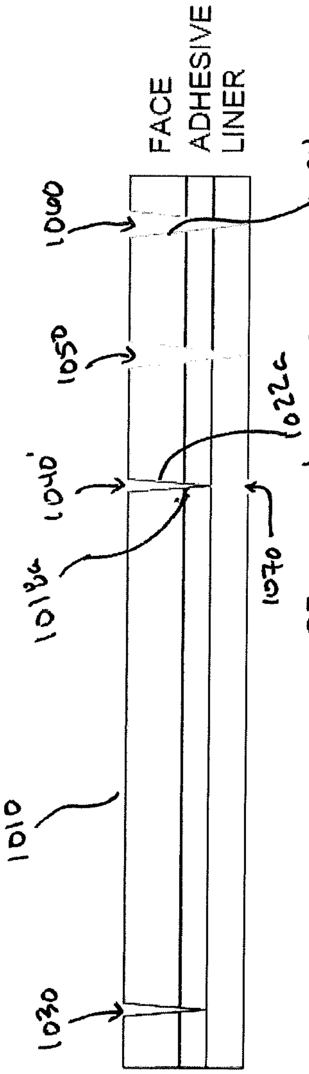
FIG. 15A is a cross-sectional view of the sheet of FIG. 14 taken along line F-F.
Figure 15B:
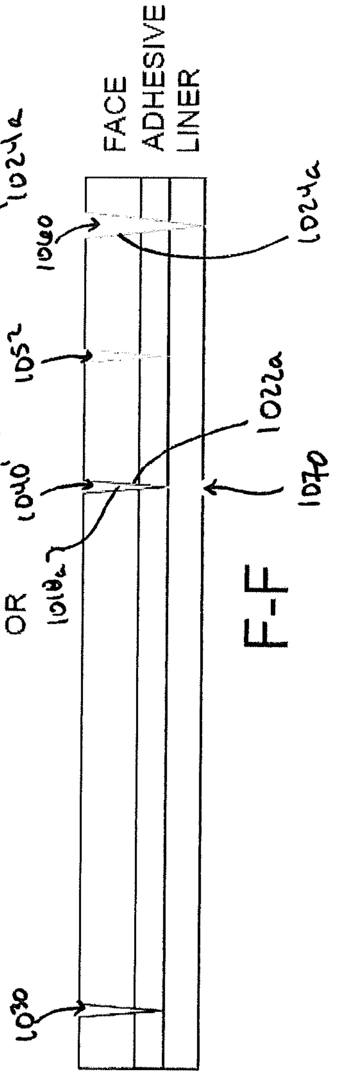
FIG. 15B is a cross-sectional view of an alternate embodiment of the sheet of FIG. 14 taken along line F-F.

In FIGS. 14, 15A, and 15B, the edges 1022*a*, 1022*b*, 1026*a*, 1026*b*, and 1025 are formed by a perforation cut. The edges 1022*a* and 1022*b* in FIGS. 15A and 15B are formed from a perforation kiss-cut to the liner, and a liner kiss-cut 1070. Edges 1026*a*, 1026*b*, and 1025 can be formed by perforation through-cuts. It will be appreciated that the edges 1022*a* and 1022*b* could also be formed from perforation through-cuts, and the liner kiss-cuts 1070 could be omitted. Edges 1024*a*, 1024*b*, and 1023 are formed from through-cuts 1060.

Figure 16:
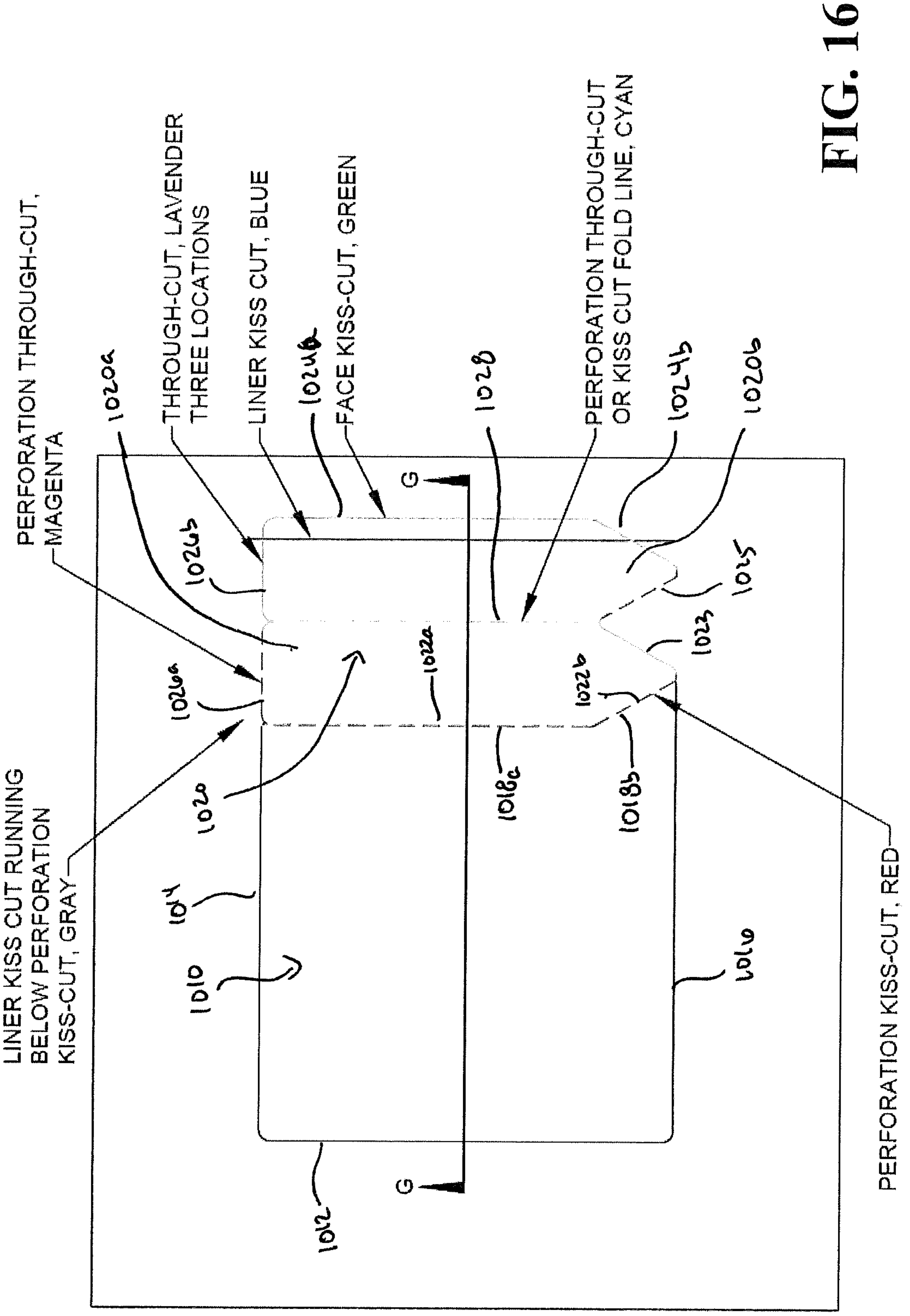
FIG. 16 is a bottom view of a sheet containing the label of FIG. 11.
Figure 17A:
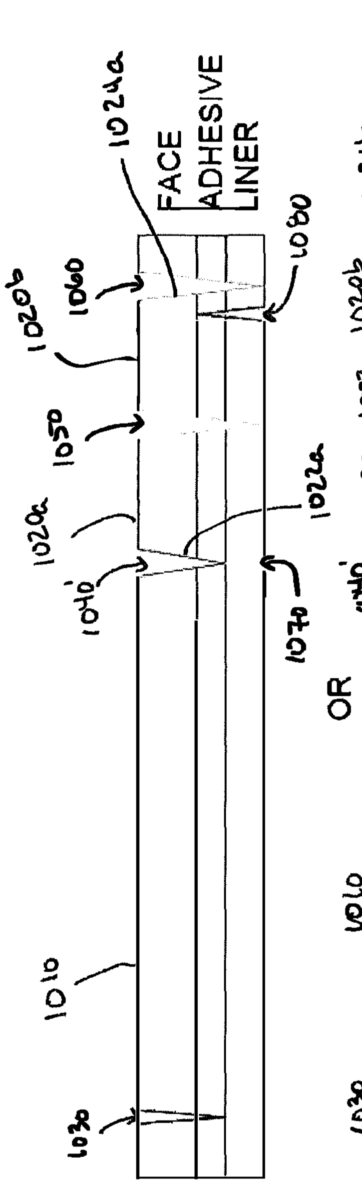
FIG. 17A is a cross-sectional view of the sheet of FIG. 16 taken along line G-G.
Figure 17B:
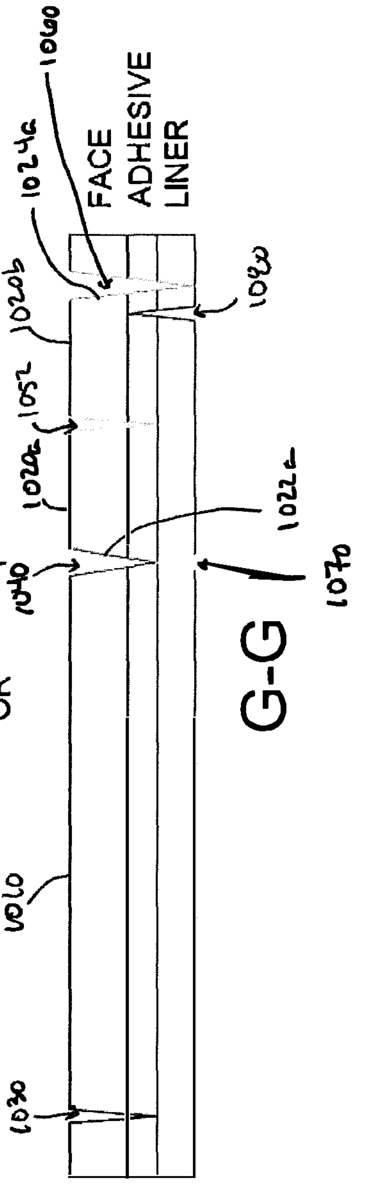
FIG. 17B is a cross-sectional view of an alternate embodiment of the sheet of FIG. 16 taken along line G-G.

In FIGS. 16, 17A, and 17B, the liner includes a liner kiss-cut 1080 that is cut to the face along a length of the section 1020*b* of the stake portion. This creates a liner region 1110 that can be removed to expose a section 1210 of adhesive to aid in adhering the label portion to a container.

The embodiments of FIGS. 11-17 allows for providing a label construction having a reduced thickness and/or allows for use of a film with reduced rigidity. In particular, providing a stake portion formed by folding means that the thickness and rigidity of the stake portion are doubled upon folding the sections to form the stake portion. The thickness and rigidity of the sheet, therefore, can be reduced. The embodiments with the foldable stake portion also allows for providing a stake portion that can have printing on both the front and back surfaces of what will be the exposed surfaces of the stake portion.

Figure 18:
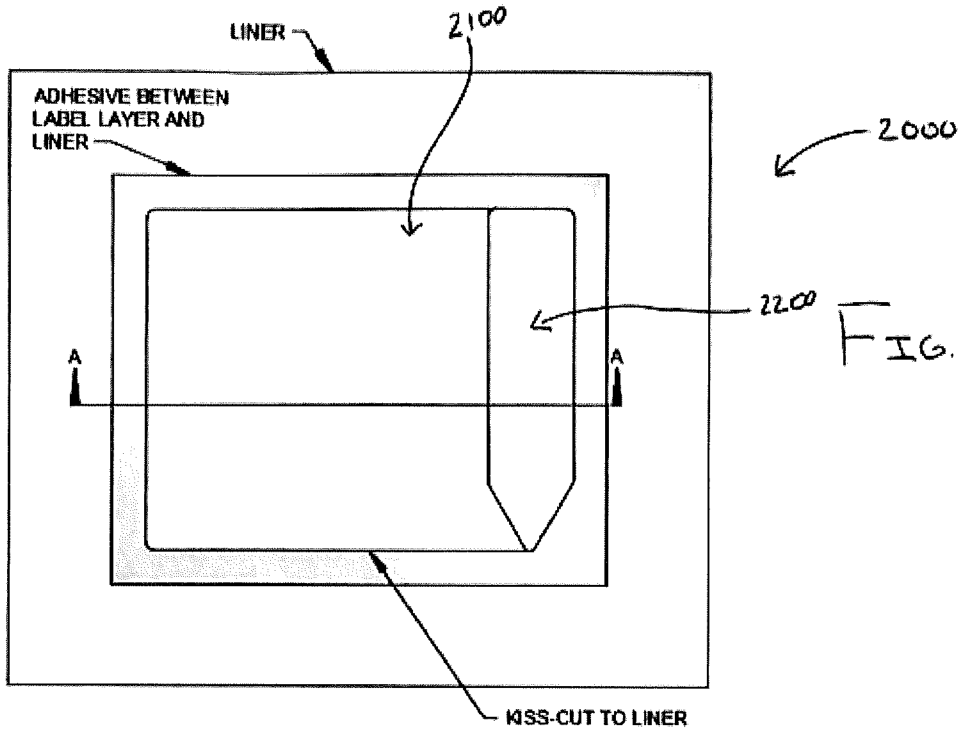
FIG. 18 is a top view of an embodiment of a label construction in accordance with an embodiment of the invention.
Figure 19:
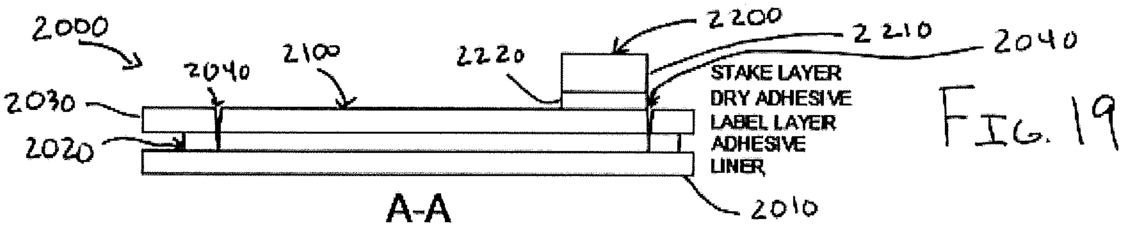
FIG. 19 is a cross-sectional view of the label of FIG. 18 taken along line A-A.

FIGS. 18 and 19 depict an embodiment of a label assembly 2000 comprising a label portion 2100 and a stake portion 2200, where the stake portion 2200 overlies the label portion 2100, i.e., the stake portion is disposed on an upper surface of the label portion. The label portion 2100 is formed in a sheet assembly comprising a liner 2010, a face layer 2030, and an adhesive layer 2020 underlying the face layer. The label is formed by a kiss-cut 2040 through the face layer and the adhesive to the liner to define the edges of the label 2100. The label portion with the stake portion adhered to the face of the label is releasable from the liner layer to remove the label form the liner.

The stake portion is releasably adhered to the upper surface of the label portion. The stake portion is formed of a stake face material 2210 and an adhesive material 2220 releasably adhering the stake 2200 to the label 2100. This arrangement allows the stake layer to be removed from the liner sheet with the label, and the entire construction can be adhered to a surface (e.g., a surface of a pot or container with a particular plant), and the stake portion 2200 can be removed from the construction when desired by an end user. The stake 2200 is configured such that the underside of the stake exhibits low levels or no tack. This can be provided by, for example, use of a dry adhesive or dry peel coating. In another embodiment, the layer 2220 can be provided by a pressure sensitive adhesive with a deadener that transfers to the adhesive when the stake is removed and creates a no tack surface on the stake 2200. It is desirable that the surface of the label 2100 underlying the stake portion 2200 have no adhesive residue remaining on the surface.

The materials for the respective layers can be selected as desired for an intended application or to provide a label and stake portion with desirable properties.

The adhesive is not particularly limited and can be selected as desired to provide a desired level of adhesion. The label adhesive layer has an upper surface and a lower surface wherein the upper surface of the adhesive layer is adhesively joined or adhered to the lower surface of the facestock.

The adhesives can generally be classified into the following categories: random copolymer adhesives such as those based upon acrylate and/or methacrylate copolymers, alpha-olefin copolymers, silicone copolymers, chloroprene/acrylonitrile copolymers, and the like; and block copolymer adhesives including those based upon linear block copolymers (i.e., A-B and A-B-A type), branched block copolymers, star block copolymers, grafted or radial block copolymers, etc., and Natural and synthetic rubber adhesives. In one embodiment the adhesive of the adhesive layer is an emulsion acrylic-based pressure sensitive adhesive.

The adhesive can be applied in a substantially solid coat in the desired area or it can be applied as a pattern. The design of the pattern is not particularly limited and can be selected as desired. Suitable patterns include, but are not limited to, vertical lines, horizontal lines, intersecting vertical and horizontal lines, diagonal lines, cross-hatch patterns, polygonal shapes (e.g., dots, triangles, rectangles, etc.), and the like.

The facestock can be selected as desired. The facestock that is used in the label constructions may comprise any of a variety of materials known to those skilled in the art to be suitable as a facestock material. For example, the facestock may be comprised of such materials as paper (e.g., kraft, bond, offset, litho, and sulfite paper) with or without sizing, or polymeric materials suitable for facestock use such as polyolefins, polyesters, polyamides, etc. In one embodiment, the requirement for the facestock material is that it be capable of forming some degree of adhesive bond to an adhesive layer. In one embodiment, the facestock comprises a polymeric film that can form the desired bond and is capable of being printed. In yet another embodiment, the polymeric film material is one that, when combined with the adhesive layer, provides a sufficiently self-supporting construction to facilitate label dispensing (label separation and application). The surfaces of the facestock material can be surface treated, such as, for example, corona treated, flame treated, or top coat treated to improve performance in various areas such as printability, adhesion to the adhesive layer in contact with the facestock, etc. In one embodiment, the polymer film material is chosen to provide the label construction with one or more of the desired properties such as printability, die-cutability, matrix-stripability, dispensability, etc.

In one embodiment, the facestock may be formed from flexible film materials including one or more layers of a polyolefin film such as, but not limited to, polypropylene, polyethylene, polymethylpentene, polybutene-1, polybutylene, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 copolymers thereof, or any blend of two or more thereof. In an embodiment, the film stock may be a non-oriented film. The facestock may also be formed from more rigid film materials including biaxially-oriented polypropylene (BOPP).

The facestock can be a monolayer polymeric film facestock or it can comprise more than one polymer film layer, some of which may be separated by an internal adhesive layer. The thicknesses of each of the layers may be varied. Multilayer film facestocks may be prepared by techniques well known to those skilled in the art such as by laminating two or more preformed polymeric films (and, optionally an adhesive layer) together, or by the co-extrusion of several polymeric films and, optionally, an adhesive layer. The multilayer facestocks can be prepared also by sequential coating and formation of individual layers, triple die coating, extrusion coating of multiple layers onto an adhesive layer, etc.

The adhesive label (facestock and adhesive layer(s)) can have a stiffness as desired for a particular purpose or intended application. Stiffness can be evaluated in any suitable manner now known or later discovered. The label stiffness can be given in terms of its ISO (International Organization for Standardization) 2493 bending resistance (at 15°) which is expressed in milliNewtons (mN).

Suitable release liners include, but are not limited to, silicone coated release substrates. Substrates contemplated are supercalendered Kraft-brand paper, glassine, polyester (such as polyethyleneterephthalate), polyethylene coated Kraft-brand paper, polypropylene-coated Kraft-brand paper, or a thermoplastic substrate. Typically these substrates are coated with a thermally cured silicone release coating such as cross-linked vinyl functionalized polydimethylsiloxane.

Release liners comprising substrates such as glassine, poly-coated Kraft-brand paper, polyethylene terephthalate, oriented or cast polypropylene, polyethylene, or polystyrene can be coated with radiation or electron-beam curable silicone such as UV curable silicone (and electron-beam curable silicone.

It will be appreciated that the label constructions can be provided on a sheet comprising one or more label constructions. The sheets can be configured to be printable with indicia as desired by an end user. The sheets can be formed by providing a facestock material, applying an adhesive layer as desired, e.g., over the entire surface of facestock in a solid or pattern, or providing one or more areas of adhesive in the shape of the label portion, and then applying a liner layer. The sheet can be fed through a machine to apply the desired die cuts to form the respective labels including the label portion and the stake portion.

In another embodiment, the a plurality of labels can be provided by forming the respective layers on a continuous web, die cutting the layers to form the labels with the label portion and the stake portion, optionally printing the label portion and/or stake portion, and winding the sheet into a roll. The roll can be provided with cuts or perforations separating adjacent label constructions that are separable from one another.

The label construction can be employed as part of a system for providing identification to a horticultural environment. The label construction can be provided and printing applied to the face layer in the region of the label portion and/or the stake portion to provide identifying information related to a plant. The printed label can be applied to a container containing the plant with the appropriate identifying information. The stake portion can be separated from the label portion and inserted into a surface (e.g., the soil or other ground material) where the plant is later disposed.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a label sheet comprising a label construction having a separable stake portion and label portion. Modifications may occur to those skilled in the art and to those who may make and use the invention. The disclosed embodiments are merely for illustrative purposes and not intended to limit the scope of the invention or the subject matter set forth in the claims.

What is claimed is:

1. A sheet assembly comprising a liner layer, a face layer, and an adhesive disposed between the face layer and the liner layer, the sheet assembly defining a label construction, the label construction comprising:

a label portion; and a stake portion adjacent the label portion, wherein an inner edge of the label portion and an inner edge of the stake portion are defined by a shared cut line such that the stake portion and the label portion are separable from one another;

wherein the adhesive layer is disposed under the label portion; and there is no adhesive underlying the stake portion.

2. The sheet assembly of claim 1, wherein the shared cut line is defined by a kiss-cut through the face layer to the liner.

3. The sheet assembly of claim 1, wherein the shared cut line comprises a partial cut through the face, and the stake portion is configured to be separated from the label portion by folding and/or snapping off the stake portion from the label portion.

4. The sheet assembly of claim 1, wherein the stake portion is defined by a continuous cut, a perforation kiss-cut, or a perforation through-cut through the face layer to the liner.

* * * * *